United States Patent [19]

Ashizawa et al.

[11] Patent Number: 5,004,650

[45] Date of Patent: Apr. 2, 1991

[54] RUBBER-COATED GASKET MATERIAL

[75] Inventors: Masaaki Ashizawa; Kazuo Nishimoto; Atsushi Oomura, all of Kanagawa; Shuji Ito, Saitama, all of Japan

[73] Assignee: Nichias Corporation, Tokyo, Japan

[21] Appl. No.: 350,796

[22] Filed: May 11, 1989

[30] Foreign Application Priority Data

Jul. 19, 1988 [JP] Japan .................. 63-179844

[51] Int. Cl.⁵ .................. B32B 15/06; B05D 1/36
[52] U.S. Cl. .................. 428/463; 277/235 B; 427/409
[58] Field of Search .......... 428/472, 465, 463, 332; 277/235 B; 427/409

[56] References Cited

U.S. PATENT DOCUMENTS 2,957,784  10/1960  Schiefelbein .................. 428/472

Primary Examiner—Thomas J. Herbert
Attorney, Agent, or Firm—Cushman, Darby & Cushman

[57] ABSTRACT

A rubber-coated gasket material has a rubber layer formed on one or both sides of a metal sheet. The rubber layer has incorporated therein a nitrile rubber containing a carboxyl group in such an amount that the proportion of a carboxylic monomer as calculated in term as of a monomer content in the rubber component is in the range of 2-15 wt. %. The rubber layer is formed in a thickness of 10-300 μm per side, and bonded to a metal sheet with a primer layer based on a phenolic resin being interposed between the rubber layer and the metal sheet.

5 Claims, 1 Drawing Sheet

RUBBER-COATED GASKET MATERIAL

BACKGROUND OF THE INVENTION

1. Field of the Invention

The present invention relates to a rubber-coated gasket material having a rubber layer formed on one or both sides of a metal sheet. Gaskets worked from this material not only have a sealing capability but also are adapted for use under hostile conditions such as those where repeated impact and abrasion are exerted by other parts.

Rubber-coated gasket materials contemplated by the present invention are fabricated by punching or stamping desired shapes out of sheeting having a rubber coat formed on the surface of a metal substrate such as a sheet of cold-rolled steel, stainless steel or aluminum. The so fabricated materials are used as gaskets in various apparatus and machines. Because metal sheets are used as substrates, the rubber-coated gaskets will not allow any leakage of the internal gas under pressure. In addition, the elasticity of the rubber layer enables the gasket to closely fit the irregularities which may be found in the surface of a flange and thereby insures reliable sealing properties.

Attempts have been made to furnish a single gasket with more than one capability, for example, a sealing capability plus the ability to work as a stopper of the lead in a lead valve, and such a gasket is inevitably used under hostile conditions, i.e., the rubber coated surface is repeatedly struck or abraded with a metallic or resin lead.

The structure of a rubber-coated gasket material of the type contemplated by the present invention is shown in cross section in FIG. 1. A prior art process for producing such a gasket material is described in U.S. Pat. No. 2,957,784 and comprises a plurality of steps. First, a metal sheet 1 is degreased and then roughened by a suitable technique such as shot blasting or Scotch brightening. A chemical conversion coating 2 is then formed on the metal surface. A primer coating 3 is then formed as an adhesive layer by applying a primer based on a phenolic resin. The primer layer 3 is then coated with a given thickness of a rubber solution which is a mixture of nitrile rubber with a reinforcing carbon black filler, as well as a curing agent and other additive commonly used in rubbers. The coating solution is then dried and cured to form a rubber layer 4. Finally, depending upon the operating conditions of the gasket, a nonsticky layer 5 is formed on the rubber layer 4 by coating a dispersion of graphite, molybdenum disulfide, etc.

The prior art rubber-coated gasket material described above exhibits good sealing properties (e.g. high resistance to oils and chemicals) since nitrile rubber is used as a polymer in the rubber layer 4 formed on the phenolic resin based primer layer 3. On the other hand, mechanical aspects of the gasket performance including strength and has wear resistance have not been considered very seriously in this prior art product, so that if the gasket is of a type that is to be subjected to repeated impact and abrasion by the lead of a lead valve, the strength of the rubber layer 4 itself and the adhesion between this rubber layer and the primer layer 3 are insufficient to prevent the occurrence of cracking in the rubber layer 4 and blistering between the rubber layer 4 and the primer layer 3.

SUMMARY OF THE INVENTION

An object, therefore, of the present invention is to provide a rubber-coated gasket material that has not only high oil and chemical resistance but also is improved in the strength and wear resistance of the rubber layer formed on the phenolic resin based primer layer and in the adhesion between this rubber layer and the primer layer.

The rubber-coated gasket material of the present invention which has a rubber layer formed on one or both sides of a metal sheet has been developed to solve the aforementioned problems of the prior art product. In the gasket material of the present invention, a rubber layer that has incorporated therein a nitrile rubber containing a carboxyl group in such an amount that the proportion of a carboxylic monomer as calculated in terms of a monomer content in the rubber component is in the range of 2-15 wt. % and which is formed in a thickness of 10-300 $\mu$m per side is bonded to a metal sheet with a primer layer based on a phenolic resin being interposed between the rubber layer and the metal sheet.

The rubber-coated gasket material of the present invention may be produced by a process which comprises: preparing a rubber composition by compounding and blending a carboxylic nitrile rubber that contains a carboxyl group in such an amount that the proportion of a carboxylic monomer as calculated in terms of a monomer content in the rubber component is in the range of 2-15 wt. % and which has incorporated therein either sulfur as a first curing agent or a cure accelerator thereof, a master batch that contains zinc peroxide as a second curing agent and which has incorporated therein either one of sulfur and a cure accelerator thereof that is not incorporated in said nitrile rubber, and an additive such as a filler, a rubber chemical or a solvent; coating said rubber composition onto one or both sides of a metal sheet that has been coated with a primer based on a phenolic resin; and curing and baking the applied coating.

DETAILED DESCRIPTION OF THE INVENTION

Figure 1:
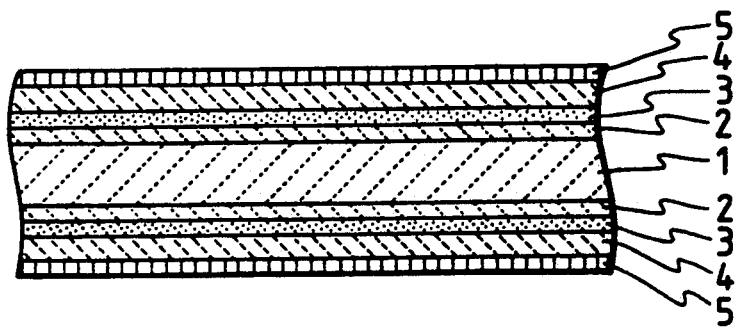
FIG. 1 is a cross-sectional view showing the structure of a rubber-coated gasket material contemplated by the present invention.

The accomplishment of the present invention is based on the finding by the present inventors that by forming a rubber layer of a carboxylic nitrile rubber having a specified composition and, in particular, by curing said nitrile rubber with a zinc peroxide and sulfur combination system, the strength of the rubber layer itself and the strength of adhesion between this rubber layer and a primer layer can be improved markedly. The carboxyl group in the nitrile rubber and the methylol group in a phenolic resin (in a novolak, methylol groups are formed in the process of reaction with hexamethylenetetramine) undergo dehydrative condensation to provide improved adhesion between the nitrile rubber and the phenolic resin. Thus, the strength and adhesion of the rubber layer near the interface with the primer layer are sufficiently improved to eliminate the cause of blistering. In order to attain this result, the content of a carboxylic monomer in the rubber component must be within the range of 2-15 wt. %, preferably 4-10 wt. %.

If the monomer content is less than 2 wt. %, the density of crosslinking is too small to ensure satisfactory improvement in tensile strength If the monomer content exceeds 15 wt. %, not only is resistance to low temperatures and water reduced but also scorching is prove to occur. The nitrile rubber whose content of a carboxylic monomer is 2-15 wt. % may be a blend of a nitrile rubber and a carboxylic nitrile rubber. The thickness of the rubber layer is also related to the performance of a gasket. If the thickness of the rubber is less than 10 $\mu$m, it is not capable of closely fitting the irregularities that may be found in the surface of a flange, and if its thickness exceeds 300 $\mu$m,, substantial effects will be exerted by thermal deterioration. If the thickness of the primer layer is less than 2 $\mu$m, a self-supporting layer is not formed. If the primer layer is thicker than 40 $\mu$m, the chance of the occurrence of defects increases.

Zinc peroxide decomposes at about 150° C. to form zinc oxide, which allows the nitrile rubber to cure through zinc cross-linking. Thus, sulfur crosslinking and zinc crosslinking combine to achieve marked improvement in the strength of the rubber layer to such an extent that no destruction or cracking will occur in the area of the rubber layer where it contacts the lead of a lead valve.

Zinc oxide cures rapidly, so if it is premixed in a carboxylic nitrile rubber, curing will generally start while the nitrile rubber is being dissolved in a solvent. This phenomenon also occurs when a carboxylic nitrile rubber formulated as a rubber coating solution is mixed with a solution of curing agent composed of zinc oxide or a zinc oxide master batch; the viscosity of the mixture will increase so rapidly as to render the subsequent coating operation impossible.

This problem of premature curing associated with the use of zinc oxide can be avoided in the present invention by using zinc peroxide as an additional curing agent. No marked increase in viscosity occurs and efficient coating is possible even if zinc peroxide is mixed in a carboxylic nitrile rubber before it is dissolved in a solvent or even if a coating solution of the carboxylic nitrile rubber is mixed with a curing solvent composed of zinc peroxide or a zinc peroxide master batch. However, even the combination of the carboxylic nitrile rubber and zinc peroxide will undergo gradual curing over time, so that if prolonged storage is intended, the carboxylic nitrile rubber is preferably kept separate from zinc peroxide or a zinc peroxide master batch.

In the practice of the process of the present invention, storing sulfur and a cure accelerator thereof in the same compound should be avoided since this will potentially cause premature curing. A recommended practice is to incorporate sulfur in the carboxylic nitrile rubber, and a cure accelerator of sulfur in a zinc peroxide master batch, or zinc versa. If desired, a cure accelerator of sulfur may be incorporated in another nitrile rubber to prepare a separate master batch.

The following examples are provided for the purpose of further illustrating the present invention but are in no way to be taken as limiting.

EXAMPLE 1

A cold-rolled steel sheet 1 (See FIG. 1) having a thickness of 0.3 mm was provided. The surface of the steel sheet was degreased with an alkali and then roughed by a Scotch brightening method. A corrosion-resistant iron phosphate coating 2 was then formed on the sheet's surface by a phosphate conversion process.

Metal sheets that can be used as the substrate in accordance with the present invention include not only cold-rolled sheet sheets but also carbon steel sheets, alloyed steel sheets, stainless steel sheets, aluminum and aluminum alloy sheets, copper and copper alloy sheets, etc. The thickness of these metal substrates varies with the specific characteristics required of the gasket which is to be formed therewith and is generally in the range of 0.1-1.6 mm.

While alkali degreasing was used in this example, other methods of degreasing such as solvent degreasing, electrolytic degreasing, ultrasonic cleaning and steam cleaning can also be employed in accordance with the present invention. Furthermore, the roughening method is not limited to Scotch brightening, as noted above, but may include sand blasting, shot blasting, grit blasting and polishing with sand paper.

The chemical conversion process which follows the degreasing step varies with the type of metal substrate sued; a phosphate is preferably formed on cold-rolled steel sheets whereas a chromate coating is preferably formed on aluminum sheets. Stainless steel sheets are chemically more inert than other metals and hence are difficult to bond. Chemical conversion processes commonly employed with stainless steel sheets include oxalating and plating with easily bonding metals such as zinc and copper.

Following the formation of the iron phosphate coating 2, a primer having the composition indicated below was coated on both sides of the steel sheet 1 with a reverse roller coater. By heating at 160° C. for 3 minutes, a primer layer 3 was formed having a thickness of 10 $\mu$m per side.

| Recipe of primer | phr |
|---|---|
| Nitrile rubber (NBR) | 100 |
| Stearic acid | 0.5 |
| Zinc white 5 | |
| Carbon black | 150 |
| Coumarone-indene resin | 40 |
| Antioxidant | 5 |
| Sulfur | 1.2 |
| Cure accelerator | 2.4 |
| Phenolic resin | 456 |
| Ketonic solvent | 4,310 |

The mixing ratio of the phenolic resin to the nitrile rubber compound consisting of the eight components listed above the "Phenolic resin" is generally in the range of from about 8:2 to about 4:6, preferably at about 5:4. The phenolic resin is either a novolak or a resole or a mixture thereof. Preferably, a resole and novolak mixture containing at least 30 wt. % of the resole is used. In addition to purely phenolic resins, modified phenolic resins including cresol-modified, cashew-modified, alkylbenzene-modified and furan-modified phenolic resins may also be used. The nitrile rubber as the polymer component of the nitrile rubber component may be replaced by a carboxylic nitrile rubber or a chlorinated rubber. Illustrative ketonic solvents include methyl ethyl ketone, methyl isobutyl ketone and diisobutyl ketone, and these may be used in admixture with alcoholic solvents such as methanol and ethanol. The solids content of the primer is preferably adjusted to be within the range of 10-25 wt. %. The coated primer layer is dried and baked in an oven at 130°-180° C. for about 1-10 minutes. The primer coating preferably has a thickness of about 5-20 $\mu$m on a dry basis.

A rubber coating solution having the composition indicated below was then applied to the resulting primer layer 3 with a knife coater. The applied coating was dried at 70° C. for 30 minutes and cured at 180° C. for 20 minutes to form a rubber layer 4 (110 μm thick per side) on both sides of the steel sheet 1.

| Recipe of rubber coating solution | phr |
| --- | --- |
| Nitrile rubber containing 6% carboxyl group | 100 |
| Stearic acid | 1 |
| Carbon black | 40 |
| Antioxidant | 5 |
| Sulfur | 0.5 |
| Zinc peroxide master batch | 15 |
| Cure accelerator of sulfur | 4 |
| Toluene | 443 |
| Alcoholic solvent | 53 |

The carboxylic nitrile rubber compound consisting of the four components listed above the "Sulfur" and the zinc peroxide master batch were kept as separate solutions until they were mixed just prior to coating. The mixing operation continued for about 15–60 minutes.

The zinc peroxide master batch was prepared by mixing zinc peroxide and NBR in equal amounts and the cure accelerator of sulfur was incorporated in the resulting master batch. This eliminates the need to prepare a separate batch for the cure accelerator.

Solvents for the rubber compound and the master batch include aromatic hydrocarbons such as toluene and xylene, ketones such as methyl ethyl ketone and methyl isobutyl ketone, and esters such as butyl acetate and propyl acetate. These solvents may be used either on their own or as admixtures. These solvents may also be mixed with alcoholic solvents such as ethanol and isopropanol.

The rubber coating solution preferably has a solids content of from about 20 to about 40 wt. %. The viscosity of the coating solution is preferably adjusted to be within the range of from about 2,000 to about 3,000 cps, which is an optimum range for application with a knife coater. The preferred drying conditions are approximately 60°–130° C. x 5–20 minutes, and the preferred curing conditions are approximately 160°–250° C. x 5–30 minutes.

With a view to preventing seizure and to imparting non-stickness to the surface of rubber layer 4, a dispersion of graphite or molybdenum disulfide was coated on the rubber layer 4 and dried to form a nonsticky layer 5. The dispersion may contain a binder such as paraffin wax, an acrylic resin or a phenolic resin. The nonsticky layer 5 is not an essential element and may be omitted.

By the procedures described above, rubber-coated gasket material having a total thickness of 0.84 mm was fabricated.

EXAMPLE 2

A rubber-coated gasket material was fabricated as in Example 1 except that the 6% carboxylic nitrile rubber in the rubber coating solution was replaced by a 2% carboxylic nitrile rubber.

EXAMPLE 3

A rubber-coated gasket material was fabricated as in Example 1 except that the 6% carboxylic nitrile rubber was replaced by a 1:1 blend of 6% carboxylic nitrile rubber and pure nitrile rubber.

EXAMPLE 4

Using a 0.4-mm thick aluminum sheet, a rubber-coated gasket material having a total thickness of 0.6 mm was fabricated as in Example 1, except for the following points:

(1) Chemical conversion was performed by chromating;

(2) Primer coating was heat-treated at 150° C. for 3 minutes; and (3) Rubber coating thickness was 90 μm.

EXAMPLE 5

Using 0.25-mm thick stainless steel (SUS 304) sheet, a rubber-coated gasket material having a total thickness of 0.47 mm was fabricated as in Example 1, except for the following points:

(1) Chemical conversion was performed by oxalating;

(2) Primer coating was heat-treated at 150° C. for 4 minutes; and (3) Rubber coating thickness was 100 μm.

COMPARATIVE EXAMPLE

The surface of a cold-rolled steel sheet 0.6 mm thick was degreased with alkali, roughened by Scotch brightening and chemically converted by phosphating. A phenolic resin based primer was coated on both sides of the steel sheet to form a primer layer having a thickness of 10 μm per side. A rubber coating solution having a reinforcing carbon black filler, a customary curing agent and any other necessary additives contained in nitrile rubber was coated on each primer layer and dried at 70° C. for 30 minutes to form a rubber layer (110 μm thick per side) on both sides of the steel sheet. By subsequent curing at 180° C. for 20 minutes, a rubber-coated gasket material having a total thickness of 0.84 mm was obtained.

Specimens 20 mm wide and 100 mm long were cut from the rubber-coated gasket materials prepared in Examples 1–5 and the Comparative Example. An immediate setting adhesive was applied to a 20 mm × 5 mm area of each specimen along the edge of one short side and another specimen of the same sample was bonded. The tensile strength of the so prepared test specimens was measured, and the results are shown in Table 1.

A grid pattern of 100 squares 1 mm apart was cut through the rubber coating on another set of specimens. The specimens were placed in a Geer oven in which they were subjected to accelerated aging by exposure to a hot atmosphere (200° C.) for 22 hours a day. A commercial adhesive tape was thereafter applied over the crosshatched area and quickly pulled off. The number of days required for more than ten squares in the grid to be pulled off was counted for each sample and the results are shown in Table 1.

Gaskets matching the compressor in a commercial refrigerator were punched out of the rubber-coated gasket materials fabricated in Example 1–3 and the Comparative Example. The gaskets were then installed in the compressor, which was operated under specified conditions. The results are shown in Table 1.

TABLE 1

| | Examples | | | | | Comparative |
| --- | --- | --- | --- | --- | --- | --- |
| | 1 | 2 | 3 | 4 | 5 | Example |
| Tensile strength | 278 | 152 | 225 | 295 | 300 | 150 |

TABLE 1-continued

|  | Examples | | | | | Comparative |
|---|---|---|---|---|---|---|
|  | 1 | 2 | 3 | 4 | 5 | Example |
| (kgf) State at tensile breaking | rubber broke | rubber broke | rubber broke | rubber broke | rubber broke | rubber broke |
| Adhesion test (days) | 15 | 7 | 11 | 14 | 14 | 5 |
| Operational test (300 h) | O.K | fine crack | O.K. | — | — | cracked in 168 h |

In the rubber-coated gasket material of the present invention, a rubber layer composed of a specified carboxylic nitrile rubber is combined with a primer layer based on a phenolic resin. The strength of the rubber layer itself and the strength of adhesion between this rubber layer and the primer layer are so much improved over the conventional products that the gasket material can withstand repeated impact and abrasion under hostile conditions without developing any cracking or blistering in the area subjected to such external forces.

According to the process of the present invention, the specified carboxylic nitrile rubber is cured by a specified sulfur and zinc peroxide combination system. This is effective not only in providing improved heat resistance but also in ensuring stability against scorching by preventing troubles such as rapid increase in the viscosity of rubber coating solution on account of premature crosslinking. Thus, the process of the present invention is capable of producing rubber-coated gasket materials as efficiently as when they are made from ordinary NBR.

What is claimed is:

1. In a rubber-coated gasket material which has a rubber layer formed on one or both sides of a metal sheet, the improvement wherein said rubber layer has incorporated therein a nitrile rubber containing a carboxyl group in such an amount that the proportion of a carboxylic monomer as calculated in term as of a monomer content in the rubber component is in the range of 2-15 wt. % and which rubber layer is formed in a thickness of 10-300 μm per side, and bonded to a metal sheet with a primer layer based on a phenolic resin being interposed between the rubber layer and the metal sheet.

2. A rubber coated gasket material as claimed in claim 1 wherein the portion of carboxylic monomer in the nitrile rubber is 4 to 10%.

3. A process for producing a rubber-coated gasket material, which process comprises:
   (a) preparing a rubber composition by compounding and blending a carboxylic nitrile rubber that contains a carboxyl group in such an amount that the proportion of a carboxylic monomer as calculated in terms of a monomer content in the rubber component is in the range of 2-15 wt. % and which has incorporated therein either sulfur as a first curing agent or a cure accelerator thereof;
   (b) blending said rubber composition with a master batch that contains zinc peroxide as a second curing agent and which has incorporate therein either sulfur or a cure accelerator thereof whichever is not incorporated in said nitrile rubber composition formed in step (a), and an additive such as a filler, a rubber chemical or a solvent;
   (c) coating said rubber composition onto one or both sides of a metal sheet that has been coated with a primer based on a phenolic resin; and
   (d) curing and baking the applied coating.

4. A process as claimed in claim 3, wherein said master batch which contains zinc peroxide as a second curing agent also contains a cure accelerator of sulfur.

5. A process as claimed in claim 3, wherein said master batch which contains zinc peroxide as a second curing agent also contains sulfur.

* * * * *